(12) United States Patent
Voutilainen et al.

(10) Patent No.: US 12,542,500 B2
(45) Date of Patent: *Feb. 3, 2026

(54) PILING HAMMER AND METHOD FOR STRIKING PILE

(71) Applicant: Junttan Oy, Kuopio (FI)

(72) Inventors: Tomi Voutilainen, Kuopio (FI); Roni Ryyppö, Helsinki (FI)

(73) Assignee: Junttan Oy, Kuopio (FI)

( * ) Notice: Subject to any disclaimer, the term of this patent is extended or adjusted under 35 U.S.C. 154(b) by 118 days.

This patent is subject to a terminal disclaimer.

(21) Appl. No.: 18/570,815

(22) PCT Filed: Jun. 16, 2021

(86) PCT No.: PCT/FI2021/050459
§ 371 (c)(1),
(2) Date: Dec. 15, 2023

(87) PCT Pub. No.: WO2022/263707
PCT Pub. Date: Dec. 22, 2022

(65) Prior Publication Data

US 2024/0356466 A1    Oct. 24, 2024

(51) Int. Cl.
*E02D 13/06*    (2006.01)
*E02D 7/06*    (2006.01)
*H02P 3/26*    (2006.01)
*H02P 25/06*    (2016.01)

(52) U.S. Cl.
CPC ............... *H02P 3/26* (2013.01); *E02D 7/06* (2013.01); *H02P 25/06* (2013.01)

(58) Field of Classification Search
CPC . H02P 25/06; H02P 3/26; E02D 13/06; E02D 7/06

USPC .......................................................... 318/362
See application file for complete search history.

(56) References Cited

U.S. PATENT DOCUMENTS

| | | | |
|---|---|---|---|
| 4,799,557 A * | 1/1989 | Jacquemet | B25D 11/064 173/91 |
| 11,591,187 B2 * | 2/2023 | Rodriguez | B66B 11/0407 |
| 2014/0001756 A1 * | 1/2014 | Panosyan | F03D 7/0272 290/7 |
| 2022/0025717 A1 * | 1/2022 | Netecke | E21B 19/008 |

(Continued)

FOREIGN PATENT DOCUMENTS

WO    2004013416 A1    2/2004

OTHER PUBLICATIONS

International Search Report and Written Opinion, Application No. PCT/FI2021/050459, dated Feb. 21, 2022.

*Primary Examiner* — Gabriel Agared
(74) *Attorney, Agent, or Firm* — MacMillan, Sobanski & Todd, LLC

(57) ABSTRACT

There is provided a piling hammer comprising a linear electric machine comprising a mover connected to a ram block for striking a pile, a processor operatively connected to the linear electric machine and configured to determine a recoiled kinetic energy from striking the pile using a ram block connected to a mover of the linear electric machine, determining at least a portion of the determined recoiled kinetic energy for regenerative braking of the mover to a peak position, control the linear electric machine to decelerate the mover to the peak position based on the determined at least a portion of the determined recoiled kinetic energy.

14 Claims, 11 Drawing Sheets

(56) References Cited

U.S. PATENT DOCUMENTS

2023/0129826 A1\* 4/2023 Long ................. B60K 6/485
                                                310/74
2024/0392525 A1\* 11/2024 Voutilainen ............. E02D 7/06

\* cited by examiner 402 determining a total target kinetic energy for striking a pile using a ram block connected to a mover of a linear electric machine of the piling hammer 404 determining a first portion of the total target kinetic energy for striking the pile at least based on a mass of the ram block 406 determining a second portion of the total target kinetic energy for striking the pile based on the total target kinetic energy and the first portion of the total target kinetic energy 408 controlling the linear electric machine to accelerate the mover based on the determined second portion of the kinetic energy for striking the pile by the linear electric machine

Figure 4

502 update, based on an advancement of the pile, the first portion of the total target kinetic energy and the second portion of the total kinetic energy 504 control the linear electric machine based on the updated second portion of the kinetic energy for striking the pile by the linear electric machine

Figure 5

1002 determining at least a portion of the determined recoiled kinetic energy for returning the mover to a peak position after striking the pile based on a target striking frequency 1102 harvesting at least a part of the recoiled kinetic energy 1104 controlling the linear electric machine to accelerate the mover based on the harvested kinetic energy

PILING HAMMER AND METHOD FOR STRIKING PILE

TECHNICAL FIELD

The present invention relates to a piling hammer and a method for striking a pile by a piling hammer.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

It is known that in the field of piling operating machines, the hammer used for driving piles generally is of the hydraulic type. The main drawbacks of this solution are low energy efficiency that is around 70%, and the presence of hydraulic oil with all the disposal and pollution problems related to the same. Moreover, the speed of the striking hammer may at most be a little higher than that in free fall and thus, the energy that may be transferred with this type of hammers is limited and very heavy striking hammers are required for large sized piles. The effectiveness is further reduced in case of tilted processing since the force of gravity does not act in the same direction in which the striking hammer moves.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

Now, an improved method and technical equipment implementing the method has been invented, by which at least the above problems are alleviated. Various aspects include a method, an apparatus, a computer program and a non-transitory computer readable medium, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

BRIEF DESCRIPTION OF THE DRAWINGS

For a more complete understanding of the example embodiments, reference is now made to the following descriptions taken in connection with the accompanying drawings in which:

FIGS. 4, 5 and 6 illustrate examples of methods in according to at least some embodiments;

DETAILED DESCRIPTION OF SOME EXAMPLE EMBODIMENTS

Figure 1A:
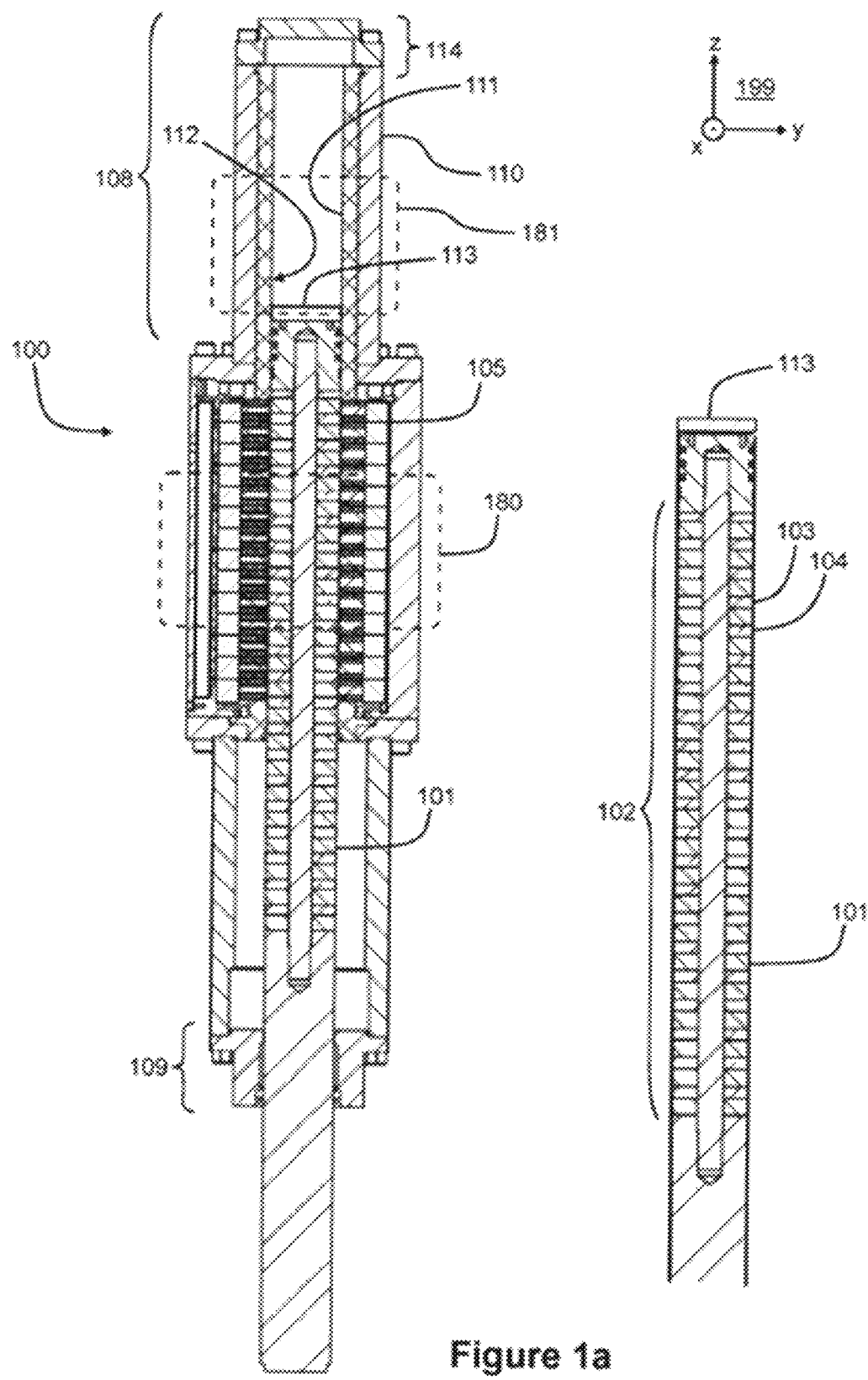
FIGS. 1a and 1b illustrate a linear electric machine according to at least some embodiments.

Use of ordinal terms such as "first," "second," "third," etc., in the claims and description to modify a described feature does not by itself connote any priority, precedence, or order of one described feature over another or the temporal order in which acts of a method are performed, but are used merely as labels to distinguish one described feature having a certain name from another described feature having a same name (but for use of the ordinal term) to distinguish the described feature.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

There is provided a piling hammer comprising a linear electric machine. The linear electric machine comprises a mover connected to a ram block for striking a pile. The piling hammer comprises a processor operatively connected to the linear electric machine and configured to determine a total target kinetic energy for striking a pile using a ram block connected to a mover of a linear electric machine of the piling hammer, determine a first portion of the total target kinetic energy for striking the pile at least based on a mass of the ram block, determine a second portion of the total target kinetic energy for striking the pile based on the total target kinetic energy and the first portion of the total target kinetic energy and control the linear electric machine to accelerate the mover based on the determined second portion of the kinetic energy for striking the pile by the linear electric machine.

There is provided a piling hammer comprising a linear electric machine. The linear electric machine comprises a mover connected to a ram block for striking a pile. The piling hammer comprises a processor operatively connected to the linear electric machine and configured to determine a recoiled kinetic energy from striking the pile using a ram block connected to a mover of the linear electric machine, determine at least a portion of the determined recoiled kinetic energy for regenerative braking of the mover to a peak position; control the linear electric machine to decelerate the mover to the peak position based on the determined at least a portion of the determined recoiled kinetic energy.

The linear electric machine comprises a mover comprising an active part containing permanent magnets provided one after another in the longitudinal direction of the linear electric machine, a stator comprising a ferromagnetic core-structure and windings for conducting electric currents, and first and second support structures on both sides of the ferromagnetic core structure of the stator in the longitudinal direction of the linear electric machine, the first and second support structures supporting the mover to be linearly movable with respect to the stator in the longitudinal direction of the linear electric machine.

The above-mentioned active part of the mover is longer than the ferromagnetic core-structure of the stator in the longitudinal direction of the linear electric machine, and the first support structure comprises a frame-portion made of solid metal, e.g. solid steel. The first support structure further comprises a support element arranged to keep the mover a distance away from the solid metal of the frame-portion and comprising a sliding surface being against the mover. The support element comprises material whose electrical conductivity, S/m, is less than that of the solid metal of the frame-portion, e.g. at most half of the electrical conductivity of the solid metal. The support element is tubular and arranged to surround an end-portion of the mover, the end-portion surrounded by the support element comprising an end-surface of the mover.

As the mover is kept the above-mentioned distance away from the solid metal of the frame-portion of the first support structure, eddy currents induced by the permanent magnets of the mover to the solid metal are reduced. Therefore, losses of the linear electric machine are reduced and thereby the efficiency of the linear electric machine is improved.

The linear electric machine can be, for example but not necessarily, a tubular linear electric machine where the ferromagnetic core-structure of the stator is arranged to surround the mover and the windings of the stator are arranged to surround the mover and conduct electric currents in a circumferential direction.

Figure 1B:
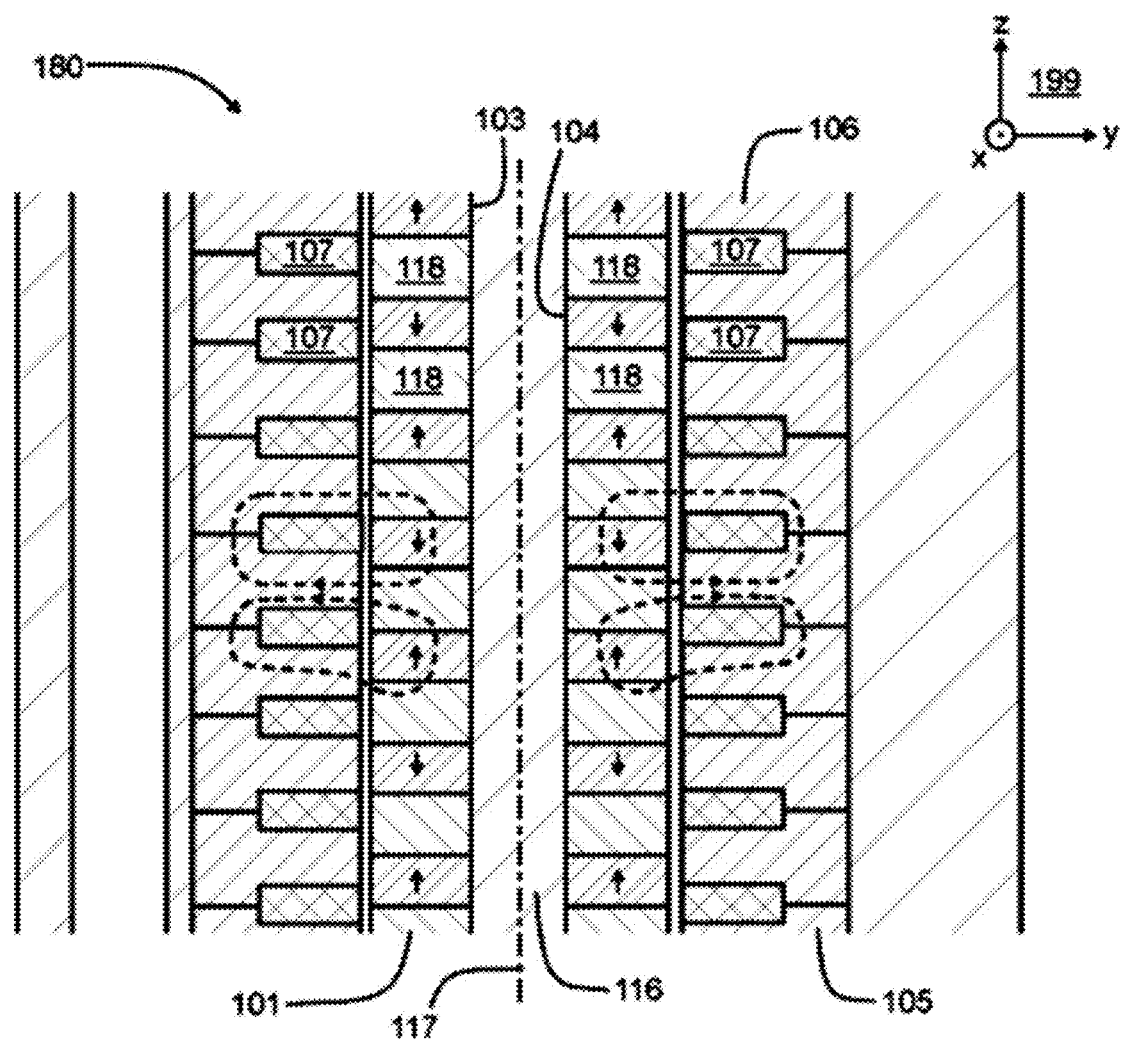

FIG. 1a shows a section view of a linear electric machine 100 according to an exemplifying and non-limiting embodiment. The section plane is parallel with the yz-plane of a coordinate system 199 comprising x, z, and y axes. FIG. 1b shows a magnification of a part 180 of FIG. 1a. The linear electric machine comprises a mover 101 and a stator 105. FIG. 1a shows a part of the mover 101 also separately for the sake of clarity. The mover 101 comprises an active part 102 that contains permanent magnets provided one after another in the longitudinal direction of the linear electric machine. The longitudinal direction is parallel with the z-axis of the coordinate system 199. In FIGS. 1a and 1b, two of the permanent magnets are denoted with references 103 and 104. The stator 105 comprises a ferromagnetic core-structure and windings for generating magnetic force acting on the mover 101 in response to supplying electric currents to the windings. In FIG. 1b, the ferromagnetic core-structure of the stator is denoted with a reference 106 and cross-sections of two coils of the windings are denoted with a reference 107. As shown in FIG. 1b, the ferromagnetic core-structure 106 constitutes stator slots for the coils of the windings. Typically, the windings are arranged to constitute a multi-phase winding, e.g. a three-phase winding, and the windings can be implemented for example so that each stator slot contains only one coil which belongs to one phase of the windings. It is, however, also possible that each stator slot contains for example two coils which can belong to different phases of the windings or to a same phase of the windings. The linear electric machine 100 comprises first and second support structures 108 and 109 on both sides of the ferromagnetic core-structure of the stator in the longitudinal direction of the linear electric machine. The first and second support structures 108 and 109 are arranged to support the mover 101 to be linearly movable with respect to the stator 105 in the longitudinal direction of the linear electric machine. As shown in FIG. 1a, the active part 102 of the mover 101 is longer than the ferromagnetic core-structure of the stator 105 in the longitudinal direction of the linear electric machine. Thus, during a reciprocating linear movement of the mover 101, some of the permanent magnets of the mover 101 are temporarily inside a frame-portion 110 of the support structure 108. The frame-portion 110 is made of solid metal, e.g. solid steel, to achieve a sufficient mechanical strength. The support structure 108 further comprises a support element 111 arranged to keep the mover 101 a distance away from the solid metal of the frame-portion 110.

The support element 111 constitutes a sliding surface 112 that is against the mover and supports the mover 101 in transversal directions, i.e. in directions perpendicular to the longitudinal direction of the linear electric machine. The support element 111 comprises material whose electrical conductivity, S/m, is less than that of the solid metal of the frame-portion 110. The electrical conductivity of the material of the support element 111 can be e.g. less than 50%, 40%, 30%, 20%, 10%, or 5% of the electrical conductivity of the solid metal of the frame-portion 110. As the mover 101 is kept the distance away from the solid metal of the frame-portion 110, eddy currents induced by the moving permanent magnets of the mover to the solid metal are reduced. As a corollary, losses of the linear electric machine are reduced and thereby the efficiency of the linear electric machine is improved. The distance can be e.g. at least 5 mm, at least 10 mm, at least 15 mm, at least 20 mm, at least 25 mm, or at least 30 mm.

The support element 111 may comprise for example polymer material or some other suitable material having low electrical conductivity and suitable mechanical properties. The polymer material can be e.g. polytetrafluoroethylene, known as Teflon. In a linear electric machine according to an exemplifying and non-limiting embodiment, the support element 111 comprises a coating constituting the sliding surface that is against the mover 101. The coating improves the wear resistance of the sliding surface of the support element 111. The coating can be for example a layer of chrome. In cases, where the coating is made of electrically conductive material, the coating is advantageously thin to reduce eddy current losses in the coating.

The exemplifying linear electric machine illustrated in FIGS. 1a and 1b is a tubular linear electric machine where the ferromagnetic core-structure 106 of the stator 105 is arranged to surround the mover 101 and the windings 107 of the stator are arranged to surround the mover 101 and conduct electric currents in a circumferential direction. The mover 101 can be, for example but not necessarily, substantially rotationally symmetric with respect to a geometric line 117 shown in FIG. 1b. The mover 101 comprises ferromagnetic core-elements that are alternately with the permanent magnets in the longitudinal direction of the mover. In FIG. 1b, two of the ferromagnetic core-elements of the mover 101 are denoted with a reference 118. In this exemplifying case, the magnetization directions of the permanent magnets of the mover 101 are parallel with the longitudinal direction, and longitudinally neighboring ones of the permanent magnets have magnetization directions opposite to each other. In FIG. 1b, the magnetization directions of the permanent magnets are depicted with arrows. Exemplifying magnetic flux lines are denoted with curved dashed lines. In this exemplifying case, the mover 101 comprises a center rod 116 that mechanically supports the permanent magnets and the ferromagnetic core-elements of the mover. The center rod 116 is advantageously made of non-ferromagnetic material in order that as much as possible of the magnetic fluxes generated by the permanent magnets of the mover 101 would flow via the stator 105. The center rod 116 can be made of for example austenitic steel or some other sufficiently strong non-ferromagnetic material.

In the exemplifying linear electric machine illustrated in FIGS. 1a and 1b, the support element 111 is tubular and arranged to surround an end-portion 113 of the mover 101. An end-portion 114 of the support structure 108 may be closed.

Figure 2:
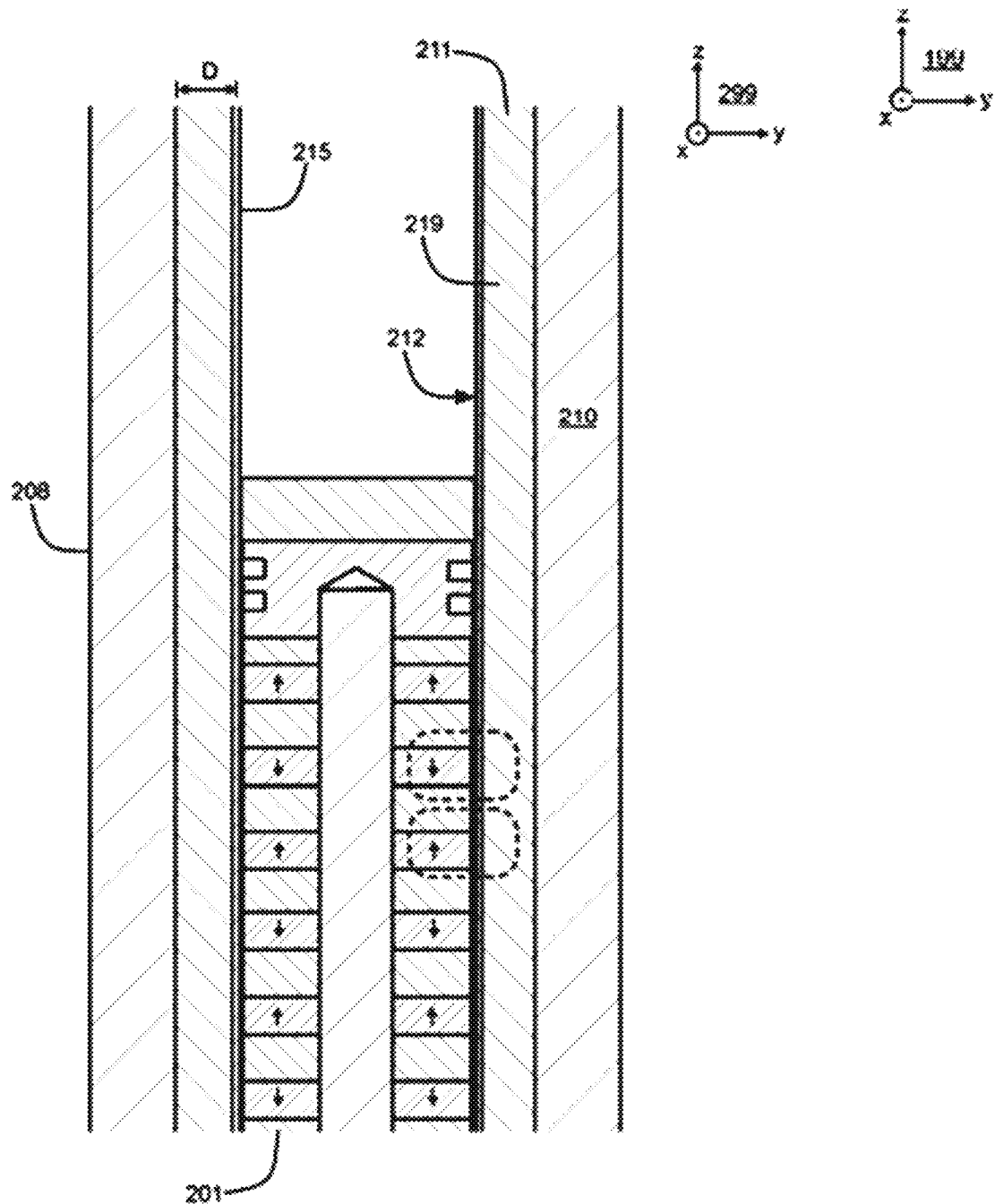
FIG. 2 illustrates a detail of a linear electric machine according to at least some embodiments.

FIG. 2 shows a section view of a part of a linear electric machine according to an exemplifying and non-limiting embodiment. The section plane is parallel with the yz-plane of a coordinate system 299 comprising x, z, and y axes. FIG. 2 illustrates a part of a support structure 208 of the linear electric machine and a part of a mover 201 of the linear electric machine. The support structure 208 is arranged to support the mover 201 in the same way as the support structure 108 is arranged to support the mover 101 in the linear electric machine 100 illustrated in FIGS. 1a and 1b. The support structure 208 comprises a support element 211 that comprises material whose electrical conductivity is less than that of solid metal constituting a frame-portion 210 of the support structure 208. In this exemplifying linear electric machine, the support element 211 comprises ferromagnetic material 219 whose electrical conductivity is less than that the solid metal constituting the frame-portion 210, e.g. at most half of the electrical conductivity of the solid metal. The ferromagnetic material 219 provides low reluctance paths for magnetic fluxes generated by permanent magnets of the mover 201, and thereby the ferromagnetic material 219 reduces magnetic stray fluxes directed to the frame-portion 210 of the support structure 208. Furthermore, the ferromagnetic material 219 reduces the flux variation taking place in the permanent magnets and thereby the ferromagnetic material reduces losses of the permanent magnets. The ferromagnetic material 219 can be for example ferrite or iron powder composite such as e.g. SOMALOY® Soft Magnetic Composite. The support element 211 further comprises a coating 215 on a surface of the ferromagnetic material and constituting a sliding surface that is against the mover 201. The coating 215 can be for example a layer of chrome.

Figure 3B:
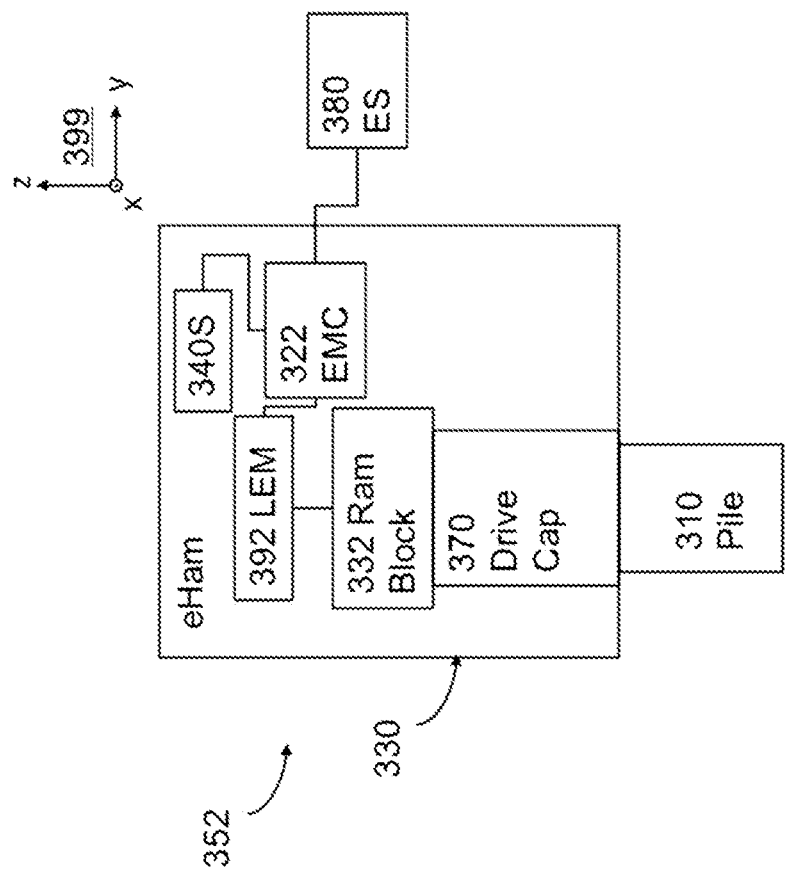
FIGS. 3a and 3b show block diagrams for hammer devices according to at least embodiments.
Figure 3A:
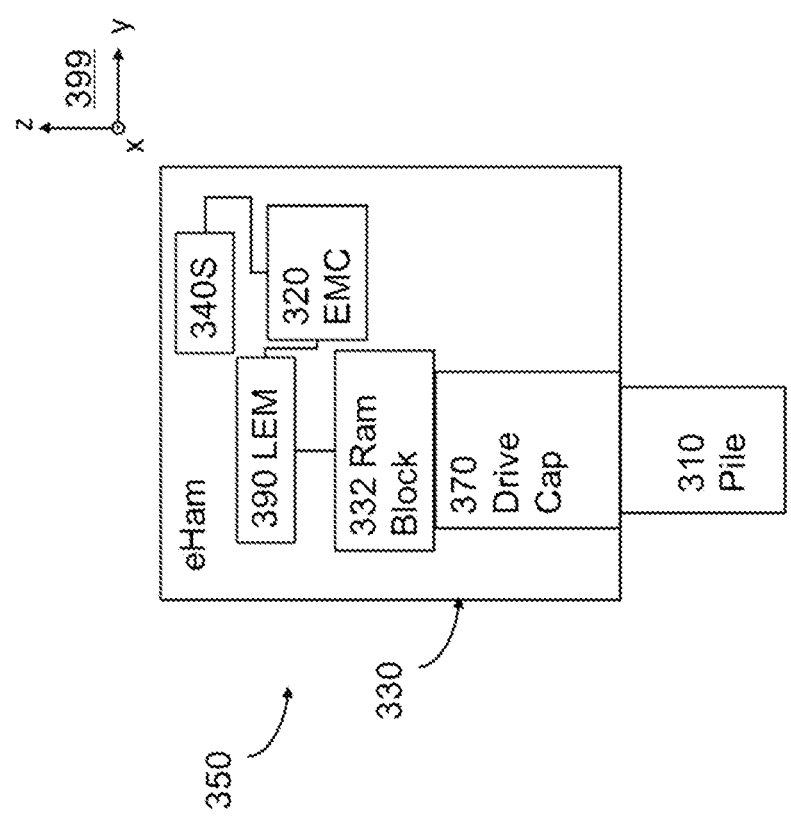

FIGS. 3a and 3b show block diagrams for hammer devices 350,352 according to at least some embodiments. Both of the hammer devices comprise linear electric machines 390,392. The hammer device comprises a processor connected to the linear electric machine. The processor is configured to perform one or more functionalities described in examples herein. The processor may be included in a control device 320,322, e.g. an electric motor controller (EMC). The control device may comprise a memory and computer program comprising instructions that, when executed by the processor cause to perform one or more functionalities described in examples herein, e.g. at least for accelerating a mover of the hammer device for striking a pile.

As a difference to the linear electric machine 390 of the hammer device 350, the linear electric machine 392 of the hammer device 352 may be used for regenerative braking and electrical current of the regenerative braking may be stored to an energy storage as controlled by a control device 322 of the hammer device. Accordingly, it should be noted that the linear electric machine 392 of the hammer device 352 may be used at least for decelerating a mover of the hammer device and additionally for accelerating the mover of the hammer device.

The hammer device 350,352 in FIGS. 3a and 3b may be a hammer for a ram pile, or a piling hammer for striking a pile 310. A piling hammer is a machine used in construction work for driving steel, concrete, or wood piling into the earth by a reciprocating movement of a hammer block. The section plane is parallel with the yz-plane of a coordinate system 399 comprising x, z, and y axes. The hammer device may comprise a frame arrangement 330 that may comprise one or more elements, e.g. guides such as leader guides, for connecting the hammer device to a leader of a pile driving machine. The hammer device 350,352 comprises a linear electric machine 390,392 and a ram block 332 connected to a mover of the linear electric machine. The piling hammer comprises an electric motor controller (EMC), or a control device, 320,322 for controlling the linear electric machine. In an example the EMC may be connected to the linear electric machine and/or an external power supply for supplying electric currents to windings of the linear electric machine for controlling a linear movement of a mover of the linear electric machine. The controlling of the linear movement of the mover may comprise accelerating or decelerating the mover. The linear movement may be a reciprocating movement in a direction parallel to the z-axis. Therefore, when connected to the mover, the ram block is linearly movable with the mover, whereby both the mover and the ram block may be moved in the same direction parallel to the z-axis. It should be noted that the z-axis may be a vertical direction on a direction inclined with respect to the vertical direction. The frame arrangement may comprise guides for supporting movement of the ram block and the mover in a direction inclined with respect to the vertical direction.

In an example, the electric motor controller (EMC), or the control device, 320,322 may be connected to a power electronic converter, or the power electronic converter may serve as the electric motor controller (EMC), or the control device, 320,322. The power electronic converter may be coupled to the windings of the stator of the linear electric machine 390,392.

The hammer device 350,352 may comprise a drive cap 370 for transferring a striking force from the ram block to a pile for driving the pile by the piling hammer. The drive cap may be constructed within a drive cap housing comprising a drive cap cushion and a rebound ring. The drive cap may have on its lower side a plurality of surfaces against which the pile 310 can fit. When striking the pile, the energy from the ram block striking the drive cap may be transferred to the pile through the drive cap that sits on top of the pile. The mover and therewith the ram block may be engaged in a reciprocating movement for continuously driving the pile by striking the pile by consecutive blows of the ram block. The linear electric machine 390,392 can be for example such as illustrated in FIGS. 1a and 1b or such as illustrated in FIG. 2.

In an example according to at least some embodiments, the ram block 332 is a modular ram block. The modular ram block is configured to support adding and removing one or more ram modules for adapting weight of the ram block. Adapting the weight of the ram block provides that energy for striking piles from potential energy of the ram block may be adapted. A low number of ram modules may have a relatively low weight, whereby a contribution of the linear electric machine 390,392 to a total energy for striking a pile may be larger than if a higher number of ram modules, and a relatively high weight of the ram block, is used for striking the pile.

The mover of the linear electric machine 390,392 and the ram block 332 may be arranged inside the frame arrangement of the hammer device and connected together for striking the pile based on coupling of a linear movement of the mover to the ram block. When the hammer ram is placed on the pile, a reciprocating linear movement of the mover and the block is used to strike the pile. The reciprocating linear movement has one or more upper positions, or peak positions, and a lower position, or a bottom position. At the one or more upper positions, the ram block is separated from a top end of the pile. At the lower position the block is in contact with the pile. The reciprocating linear movement of the mover causes the block to move between the one or more upper positions and the lower position. A blow to the pile is started by the ram block from an upper position, or a peak position, and the ram block blows the pile, e.g. by striking the drive cap, at the lower position, whereby a part of the kinetic energy of the ram block is transferred to the pile. After the blow, the ram block is returned an upper position for a subsequent blow. The upper positions, or peak positions of the subsequent blows may be the same or if the pile is advanced, the peak position of a subsequent blow may be decreased with respect to a previous blow. It should be noted that a cushion may be placed between the end of the pile and the ram block, for suitably damping the impact caused by the ram block so that damage to the pile may be avoided from striking the pile. In this way the block may strike the pile indirectly by the cushioning acting as a mediator for transferring kinetic energy of the block to the pile. It should be noted that at the lower position of linear reciprocating movement, the block may also be in a direct or indirect contact with the pile.

In an example, the piling hammer 350,352 may be configured to determine a position of the mover and/or the ram block 332. The position of the mover and/or the ram block 332 may be determined based on electrical induction, e.g. by the control device 320,322. The electrical induction may be measured by the control device connected to the LEM and/or one or more sensors 340, e.g. inductive sensors. The control device may measure electrical current induced to the windings of the LEM. Accordingly, a movement of the mover 101 induces electrical currents to the windings, which may be measured by the control device. The windings are arranged to the stator both radially around the mover and axially, parallel to the longitudinal direction of the mover, e.g. parallel to the z-axis, whereby the position of the mover may be determined based on the electrical induction of electrical current to the windings as the mover is moved linearly back and forth through the stator that holds the windings. On the other hand, the one or more sensors 340 may be arranged to the piling hammer 350, 352 for detecting a position of the mover and/or the ram block 332. The one or more sensors 340 may be arranged e.g. to the frame arrangement 330, e.g. to detect one or more upper positions and/or one or more lower positions of the mover. Examples of the one or more sensors comprise at least a mechanical position sensor comprising a sensor rod fixed to the mover of the linear electric machine. The position of the mover can also be measured in a contactless way, for example with a laser measurement arrangement. It is also possible provide the mover and the stator with structures operable as an inductive position sensor. The mover and the ram block may be directly connected to each other, whereby they may be moved as a single entity. Therefore, detecting a position of the mover or the ram block may be used to determine a position of the other. Examples of the detected positions at least a peak position and a position of the pile head. The peak position may be the highest position of the ram block 332 for striking the pile at a total target kinetic energy. After the blow to the pile by the ram block, the pile may advance and the ram block is recoiled upwards, e.g. in a direction parallel to the z-direction. The recoiled ram block is stopped at a new peak position for a subsequent blow to the pile. When the pile is advanced, subsequent peak positions of the ram block may form a decreasing series of peak positions. An advancement of the pile may be determined based on a difference between peak positions of subsequent blows or peak positions between a number of blows.

In an example, the piling hammer 352 may comprise an energy harvesting system 380 for harvesting at least a part of recoiled kinetic energy from striking the pile 310 using a ram block connected to a mover of the linear electric machine 392. The energy harvesting system may comprise an energy storage for example an electrical battery. The energy harvesting system may be connected to the linear electric machine 392 for receiving electrical current from the linear electric machine, when the linear electric machine is performing regenerative braking. When the linear electric machine is performing regenerative braking, the linear electric machine is operating as a generator of electric current for decelerating a movement of the mover. The electrical current from the linear electric machine is stored to the energy storage. The energy harvesting system may be connected to supply electrical current from the energy storage to the linear electric machine, when the linear electric machine is operating as electric motor. In this way the electrical energy stored to the energy storage may be used to accelerate the mover. The control device 322 may be connected to the energy storage and the linear electric machine for controlling the linear electric machine and flow of electric current between the linear electric machine and the energy storage.

The hammer device 350,352 may comprise a power supply. The control device may be included to a power supply or the power supply may be an external power supply. When the hammer device is installed to a pile driving apparatus, the power supply may be deployed to the pile driving apparatus. In a similar manner, the energy storage 380 may be built-in to the hammer device or the energy storage may be external to the hammer device. When the hammer device is installed to a pile driving apparatus, the energy storage may be deployed to the pile driving apparatus.

FIG. 4 illustrates a method in accordance with at least some embodiments. The method provides striking a pile by ram block driven by a linear electric machine. The method may be performed by a piling hammer or a controller device connected to the piling hammer.

Phase 402 comprises determining a total target kinetic energy for striking a pile using a ram block connected to a mover of a linear electric machine of the piling hammer.

Phase 404 comprises determining a first portion of the total target kinetic energy for striking the pile at least based on a mass of the ram block.

Phase 406 comprises determining a second portion of the total target kinetic energy for striking the pile based on the total target kinetic energy and the first portion of the total target kinetic energy.

Phase 408 comprises controlling the linear electric machine to accelerate the mover based on the determined second portion of the kinetic energy for striking the pile by the linear electric machine.

In an example, the phase 402 comprises determining the total target kinetic energy, $K_{tot}$. The total target kinetic energy, $K_{tot}$, may be determined based on a type of pile, type of ground and a blow rate for striking the pile. The total target kinetic energy, $K_{tot}$, may be expressed based on a potential energy $P_{peak}$ of the ram block at a peak position of the ram block and a kinetic energy $K_{LNE}$ added to the ram block by the linear electric machine, when the ram block is accelerated from the peak position towards the pile. The total target kinetic energy, $K_{tot}$, may be expressed by $$K_{tot} = 1/2 \times m \times v^\wedge 2 = P_{peak} + K_{LNE} - E_{loss}, \quad (1)$$

where $E_{loss}$ denotes energy consumed in losses, e.g. due to friction caused by guide rails, and v is the speed at which the ram block strikes the pile, e.g. through a drive cap.

In an example, the phase 404 comprises determining the first portion based on a peak position for the ram block or the peak position of the mover. The peak position of the mover may be preferred, since the movement of ram block is caused by the mover. On the other hand the ram block and the mover are moved as a single entity, whereby position of either one may be used to determine both the position of the mover and the position of the ram block. The first portion may be based on the potential energy $P_{peak}$ of the ram block at the peak position. When striking the pile by the ram block, the ram block is recoiled back, i.e. upwards, after the blow to the pile, i.e. after striking the pile. The recoiling movement of the ram block comes to a stop at the peak position. At the peak position the ram block has a potential energy $P_{peak}$, $$P_{peak} = m \times g \times h, \quad (2)$$

where m is the mass of the ram block, g is the gravitational acceleration of earth and h is the height of the ram block from the ground. It should be noted that in practice all of $P_{peak}$ may not be transformed into the kinetic energy due to losses, $E_{loss}$. The losses may be taken into account together with the potential energy $P_{peak}$, when determining the kinetic energy $K_{LNE}$ added to the ram block by the linear electric machine.

In an example, the phase 406 comprises determining the kinetic energy $K_{LNE}$ added to the ram block by the linear electric machine. The kinetic energy $K_{LNE}$ may be determined based on an acceleration $a_{lem}$ exerted to the ram block by the linear electric machine. Accordingly, the linear electric machine drives the ram block by exerting the ram block the acceleration $a_{lem}$, whereby kinetic energy $K_{LNE}$ of the ram block is increased. In this way the acceleration of the pile may exceed the gravitational acceleration of the Earth, g, whereby the ram block may have a total acceleration $a_{tot}$ as follows $$a_{tot} = g + a_{lem}, \quad (3)$$

where $a_{lem}$ is the acceleration exerted to the ram block by the linear electric machine. The total acceleration $a_{tot}$ of the ram block may be over 1 g, for example 1 g<$a_{tot}$≤2 g. Adding the kinetic energy to the ram block provides that the total target kinetic energy, $K_{tot}$, may be achieved for striking the pile.

The kinetic energy added to the ram block by the linear electric machine may be determined based on the formula (1), as follows:

$$K_{LNE} = K_{tot} - P_{peak} + E_{loss}. \quad (4)$$

In an example, the phase 406 comprises determining a ratio between $P_{peak}$ and $K_{LNE}$, $P_{peak}:K_{LNE}$. The ratio between $P_{peak}$ and $K_{LNE}$ may be affected by a target blow rate. If the target blow rate is increased, the peak position of the ram block may be decreased, which reduces a portion of the potential energy $P_{peak}$ in $K_{tot}$. If the target blow rate is decreased, the peak position of the ram block may be increased, which increases a portion of the potential energy $P_{peak}$ in $K_{tot}$. Accordingly, at a low target blow rate a contribution of the linear electric machine to the total target kinetic energy $K_{tot}$ may be lower compared with a higher blow rate, where the peak position of the ram block may be reduced to enable the higher blow rate, whereby the contribution of the potential energy $P_{peak}$ is also reduced.

In an example phase 408 comprises controlling an electrical current supplied to the linear electric machine for adding the kinetic energy $K_{LNE}$ to the ram block for striking the pile at the total target kinetic energy $K_{tot}$. The electrical current supplied to the linear electric machine may be determined based on the linear electric machine causing the ram block to be accelerated by $a_{lem}$ for achieving a total acceleration $a_{tot}$.

FIG. 5 illustrates a method in accordance with at least some embodiments. The method provides striking a pile by ram block driven by a linear electric machine, in connection with an advancement of the pile. The method may be performed by a piling hammer or a controller device connected to the piling hammer.

Phase 502 comprises updating, based on an advancement of the pile, the first portion of the total target kinetic energy and the second portion of the total kinetic energy. In an example, the advancement of the pile may be determined based on one or more variable examples of which comprise a type of pile, energy used for striking the pile and type of ground and a blow rate. The advancement of the pile may be determined based on a detecting a decreased peak position of the ram block or mover between successive or a series of successive blows. When the peak position of the ram block is decreased the contribution of the potential energy $P_{peak}$ to the to the total target kinetic energy $K_{tot}$ is also reduced, provided the total target kinetic energy $K_{tot}$ is maintained between successive blows. Accordingly, the contribution of the linear electric machine, $K_{LNE}$, to the total target kinetic energy $K_{tot}$ may be increased. Therefore, in an example phase 502 comprises or updating, e.g. increasing, the contribution of the linear electric machine, $K_{LNE}$, to the total target kinetic energy $K_{tot}$. Updating the $K_{LNE}$, causes a change of the ratio between $P_{peak}$ and $K_{LNE}$, $P_{peak}:K_{LNE}$ and an increase of $a_{tot}$ based on an increase of $a_{lem}$.

Phase 504 comprises controlling the linear electric machine based on the updated second portion of the kinetic energy for striking the pile by the linear electric machine. In an example phase 408 comprises controlling an electrical current supplied to the linear electric machine for adding the updated kinetic energy $K_{LNE}$ to the ram block for striking the pile at the total target kinetic energy $K_{tot}$. The electrical current supplied to the linear electric machine may be determined based on the linear electric machine causing the ram block to be accelerated by the increased $a_{lem}$ for achieving the increased total acceleration $a_{tot}$.

Figure 6:
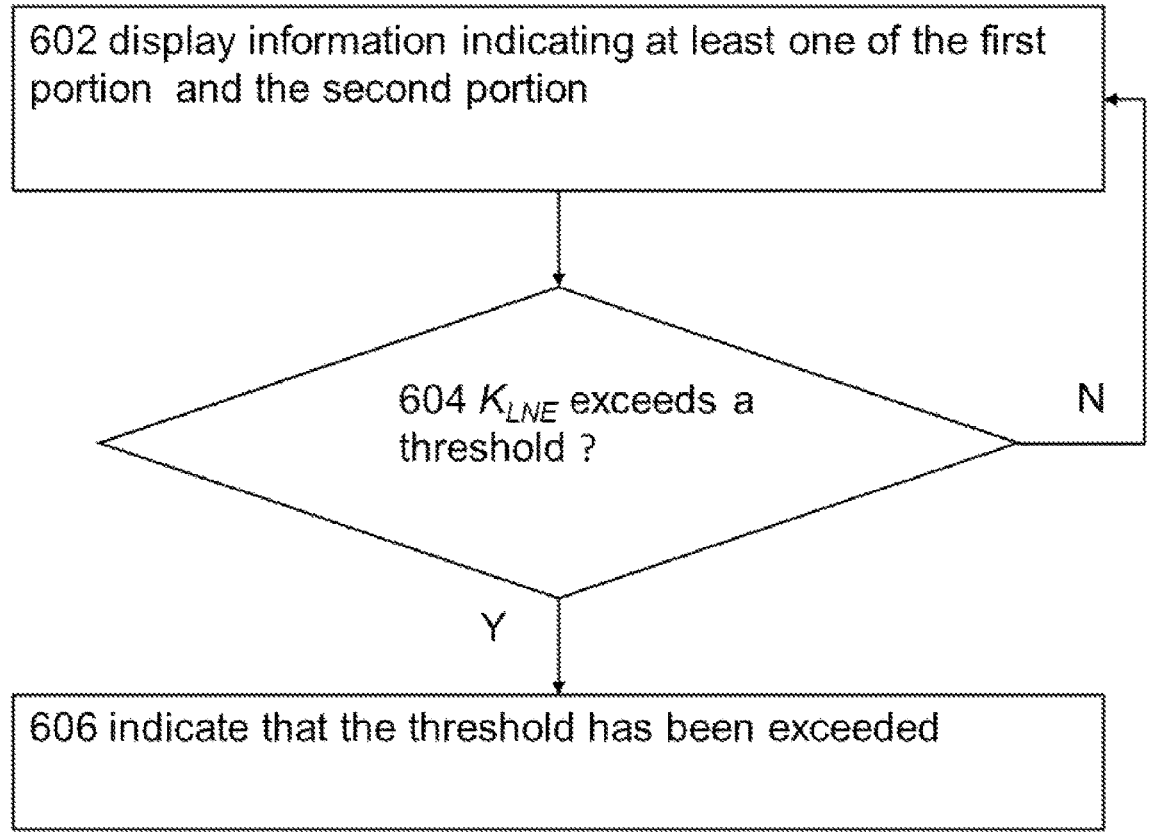

FIG. 6 illustrates a method in accordance with at least some embodiments. The method provides striking a pile by ram block driven by a linear electric machine, in connection with an advancement of the pile. The method may be performed by a piling hammer or a controller device connected to the piling hammer.

Phase 602 comprises displaying information indicating at least one of the first portion, e.g. $P_{peak}$, and the second portion, e.g. $K_{LNE}$. The information may be displayed on a user interface that is operatively connected to the controller device. Displaying the information indicating the first portion, e.g. $P_{peak}$, provides that the user may obtain information of the contribution of the mass of the ram block to the total target kinetic energy $K_{tot}$. Displaying the information indicating the second portion, e.g. $K_{LNE}$, provides that the user may obtain information of the contribution of the linear electric machine the total target kinetic energy $K_{tot}$. The displayed information assists the user to determine one or more control operations for controlling the piling hammer. In an example, the control operations may comprise adjusting, e.g. increasing or decreasing, the peak position, and/or adjusting, e.g. increasing or decreasing, a blow rate. The control operations may provide that the $K_{tot}$ may kept at a suitable range for striking the pile without breaking the pile, while also providing a sufficient working speed by advancement of the pile. If the target blow rate is increased, the peak position of the ram block may be decreased, which reduces a portion of the potential energy $P_{peak}$ in $K_{tot}$. If the target blow rate is decreased, the peak position of the ram block may be increased, which increases a portion of the potential energy $P_{peak}$ in $K_{tot}$. Accordingly, at a low target blow rate a contribution of the linear electric machine to the total target kinetic energy $K_{tot}$ may be lower compared with a higher blow rate, where the peak position of the ram block may be reduced to enable the higher blow rate, whereby the contribution of the potential energy $P_{peak}$ is also reduced.

Phase 604 comprises determining whether $K_{LNE}$ exceeds a threshold, e.g. a threshold energy level. If the threshold is exceeded, the method proceeds to phase 606 comprising controlling the user interface to indicate information indicating that the threshold has been exceeded. If the threshold is not exceeded, the method proceeds to phase 602.

In an example in phase 604, the threshold for $K_{LNE}$ may be determined based on $K_{tot}$. The threshold for $K_{LNE}$ provides that the $K_{tot}$ may be maintained at a suitable range for striking the pile without breaking the pile, while also providing a sufficient working speed by advancement of the pile. Accordingly, contribution of the $K_{LNE}$ to the $K_{tot}$ may be limited.

In an example, phase 606 comprises that the user interface causes an output indicating that the threshold has been exceeded. The output may comprise displaying information, playing audio and/or causing a tactile feedback to a user. An example of displaying information comprises displaying a warning message that may comprise a text indicating that the linear electric machine is operated at a level, where continued operation is not recommended. The warning message may be highlighted by at least one warning color. The warning message may be a notification which requires an acknowledgement of the user by user input. An example of playing audio comprises an alert sound. An example of the tactile feedback comprises a vibration of a control joystick.

Figure 7:
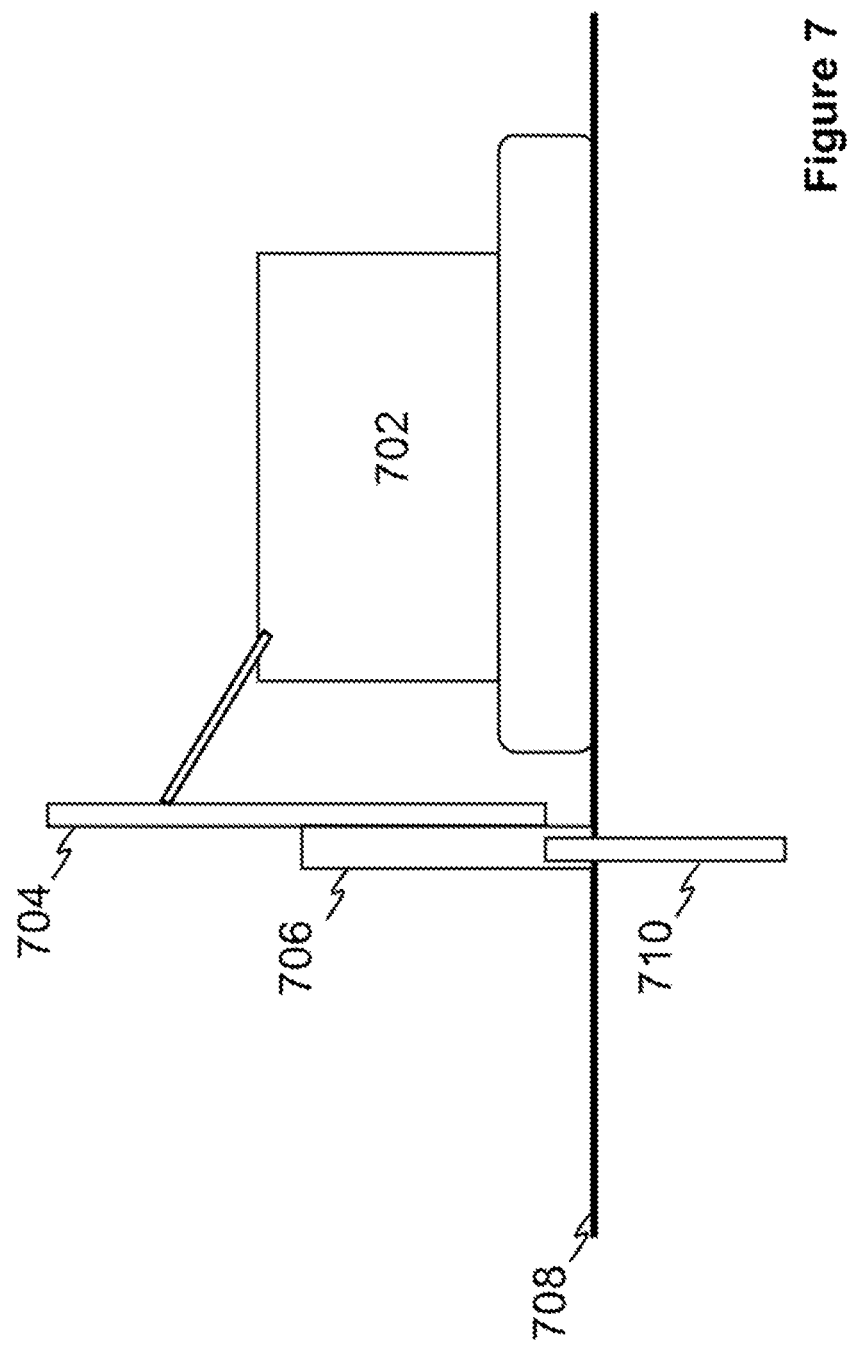
FIG. 7 illustrates an example of a pile driving apparatus according to at least some embodiments.

FIG. 7 illustrates an example of a pile driving apparatus according to at least some embodiments. The pile driving apparatus may comprise a piling hammer described in accordance with an example described herein. The pile driving apparatus 702 comprises a leader 704 and a piling hammer 706 installed to the leader. The leader is an elongated part of the pile driving apparatus, having the function of enabling a movement of the piling hammer in a direction that is transverse or inclined with respect to the ground surface 708 during driving a pile 710 into the ground. The leader may be tilted for driving the pile in a vertical or an inclined position and for tilting the leader to a horizontal position for the time of transport of the pile driving machine.

Figure 8:
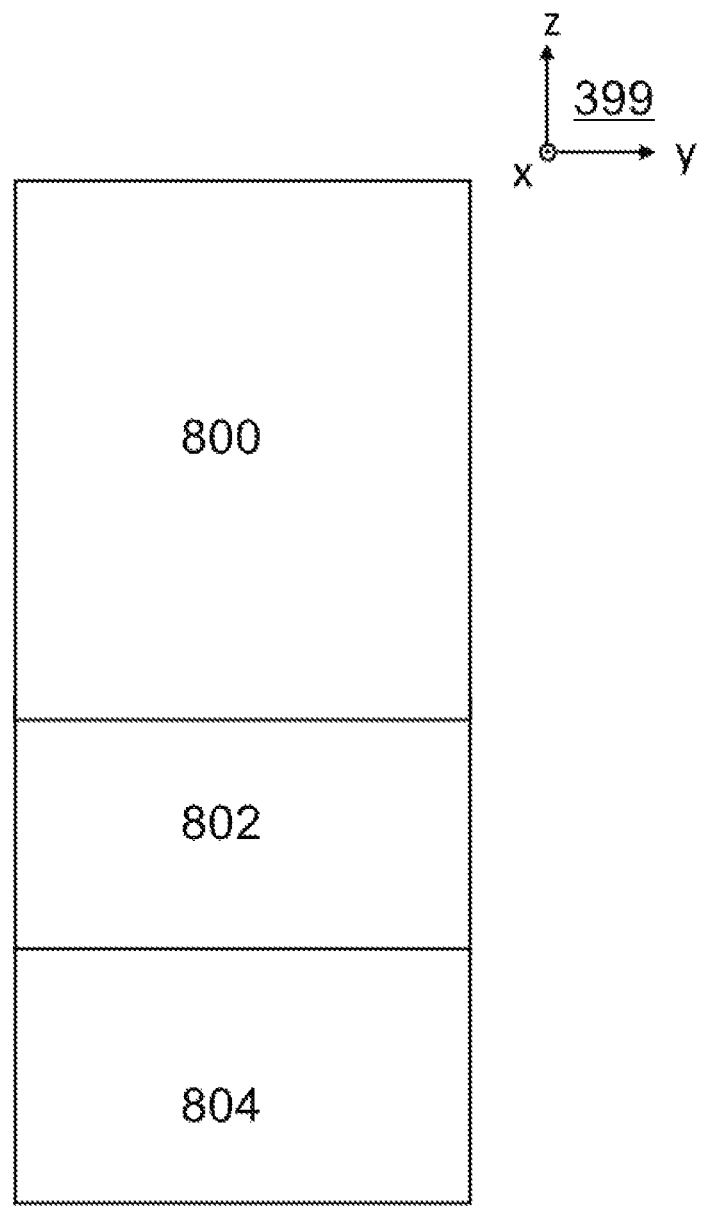
FIG. 8 illustrates an example of a connection between a ram block and a mover of an electric linear machine.

FIG. 8 illustrates an example of a connection between a ram block and a mover of an electric linear machine. The mover 800 is illustrate using the orientation of FIG. 3, whereby the mover is parallel to the z-axis. The mover 800 comprises a head 802 that extends in an axial direction, e.g. parallel to the z-axis, of the mover towards a ram block 804. The linear electric machine may be in accordance with FIG. 1a, whereby the mover has axially separated ends, wherein one of the ends is at closer to the support structure 109 and one of the ends is closer to the support structure 110. The head may be arranged at the end of the mover closer to the support structure 109, whereby the head protrudes outside of the linear electric machine. The head comprises of a lifting eye. The ram block comprises a lifting bracket. The lifting eye pin provides that the head is adapted to connect with the ram block. When the linear machine is operated the mover is moved parallel to the z-axis. When the mover is connected by the head to the ram block, the ram block may be moved by the mover and the ram block and the mover form a single entity. Thanks to the mover being connected directly to the ram block, power of the linear electric machine is coupled directly without intermediary gear or transmission to the ram block, whereby a linear movement of the mover may be directly coupled to the ram block. In this way power of the linear electric machine may be efficiently transferred to a movement of the ram block for striking the pile. It should be noted that since there is no need for gears or transmission between the linear electric machine and the ram block, downtime due to service need of such gears or transmission may be avoided which supports operational efficiency of the piling hammer.

Figure 9:
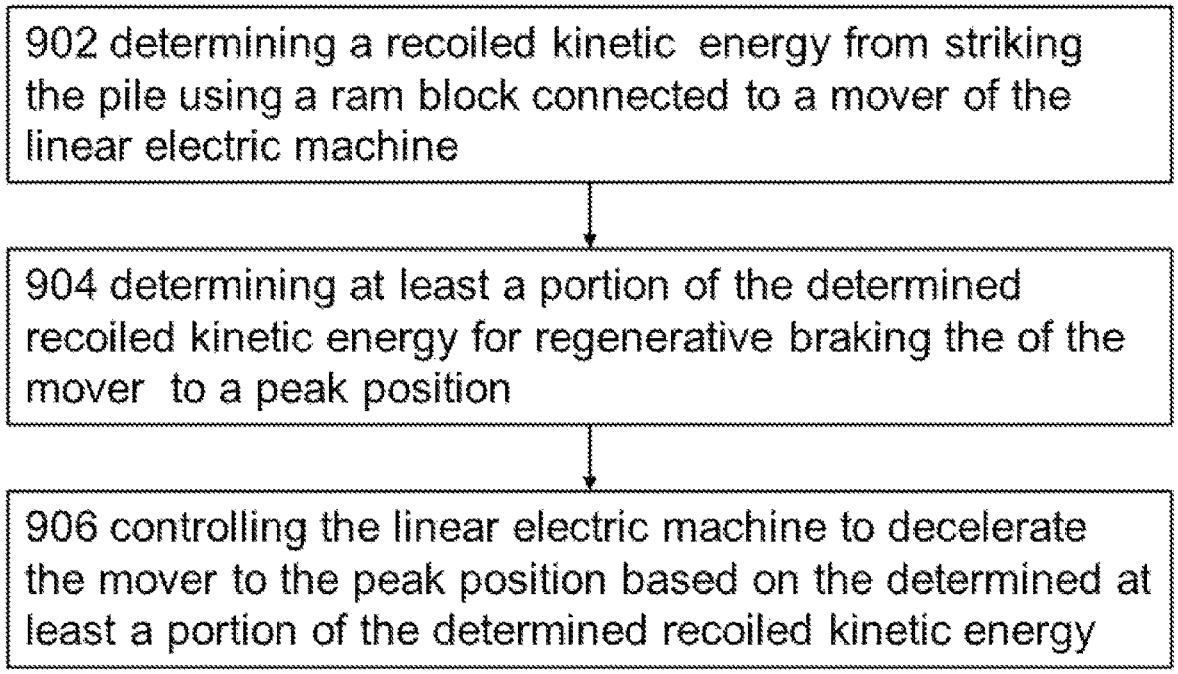
FIGS. 9, 10 and 11 illustrate examples of methods in according to at least some embodiments.

FIG. 9 illustrates an example of a method according to at least some embodiments. The method may be performed by a piling hammer or a controller device connected to the piling hammer.

Phase 902 comprises determining a recoiled kinetic energy from striking the pile using a ram block connected to a mover of the linear electric machine.

Phase 904 comprises determining at least a portion of the determined recoiled kinetic energy for regenerative braking of the mover to a peak position.

Phase 906 comprises controlling the linear electric machine to decelerate the mover to the peak position based on the determined at least a portion of the determined recoiled kinetic energy.

In an example phase 902 comprises determining a speed of the ram block after the ram block has struck the pile. The speed of the ram block may give the recoiled kinetic energy based on:

$$K_{rec} = 1/2 \times m \times v_{rec}{}^{\wedge}2, \qquad (5)$$

where $K_{rec}$ is the recoiled kinetic energy, $v_{rec}$ is the speed of the ram block after the ram block has struck the pile, m is the mass of the ram block. The speed may be determined based on measuring a position of the ram block. The position of the ram block may be determined based on direct or indirect measurements of electric current of the windings of the linear electric machine.

In an example phase 902 comprises determining a speed of the ram block based on energy lost by the ram block striking the pile. The $K_{rec}$ may be determined then by $$K_{rec} = K_{tot.} - E_{loss}, \quad (6)$$

where $K_{rec}$ is the recoiled kinetic energy, $K_{tot}$ is the total target kinetic energy for striking a pile and $E_{loss}$ is energy lost in striking the pile, e.g. transferred to the pile and/or heat. In an example phase 904 comprises the at least portion of the recoiled kinetic energy may be determined based on a peak position of the ram block. The peak position of the ram block may be used to determine a braking energy needed to stop the ram block to the peak position. Accordingly, the energy at the peak position is $$P_{peak} = K_{rec} - E_{loss} - E_{brake}, \quad (6)$$

where $P_{peak}$ is the potential energy of the ram block at a peak position of the ram block, $E_{brake}$ is the energy for regenerative braking, $K_{rec}$ is the recoiled kinetic energy and $E_{loss}$ denotes energy consumed in losses, e.g. due to friction caused by guide rails.

In an example phase 906 comprises controlling the linear electric machine to decelerate the mover to the peak position based on $E_{brake}$. The controlling may comprise supplying electric currents to the windings of the linear electric machine, whereby a movement of the mover is decelerated and the mover comes to a stop at the peak position. Accordingly, the $E_{brake}$ may be used to determine electric currents that are supplied to the windings for causing a braking force to the mover, whereby the mover is stopped at the peak position.

Figures 10, 11:

FIG. 10 illustrates an example of a method according to at least some embodiments. The method may be performed by a piling hammer or a controller device connected to the piling hammer.

Phase 1002 comprises determining at least a portion of the determined recoiled kinetic energy for returning the mover to a peak position after striking the pile based on a target striking frequency.

In an example, phase 1002 comprises that the determined portion of the kinetic energy is $$P_{peak} = K_{rec} - E_{loss} - E_{brake}. \quad (7)$$

In an example, phase 1002 comprises that the at least portion of the determined recoiled kinetic energy for returning the mover to a peak position after striking the pile is a part of the $K_{rec}$, that is consumed in moving the mover to the peak position, thus '$K_{rec}-E_{loss}-E_{brake}$'. The '$E_{loss}+E_{brake}$' is consumed during a time it takes from the mover to reach the peak position. The time may be determined based on the target striking frequency, whereby the linear electric machine may be controlled to brake the movement of the mover based on $$E_{brake} = W_{brake} \times 1/2 \times 1/f_{strike}, \quad (8)$$

where $E_{brake}$ is the energy for regenerative braking, $W_{brake}$ is the power at which the linear electric machine brakes the mover and $f_{strike}$ is the striking frequency. Therefore, the $P_{peak}$ becomes $$P_{peak} = K_{rec} - E_{loss} - W_{brake} \times 1/2 \times 1/f_{strike}. \quad (9)$$

FIG. 11 illustrates an example of a method according to at least some embodiments. The method may be performed by a piling hammer or a controller device connected to the piling hammer.

Phase 1102 comprises harvesting at least a part of the recoiled kinetic energy.

Phase 1104 comprises controlling the linear electric machine to accelerate the mover based on the harvested kinetic energy.

In an example phase 1102 comprises that the linear electric machine is connected to an energy storage. The energy storage may be an electrical battery. The linear electric machine may be controlled to operate as current generator, after the ram block as struck the pile and the ram block is recoiled backwards from the pile towards a peak position of the ram block. The linear electric machine may be operated as a current generator during the time the mover is moving backwards, i.e. away, from the pile. When the peak position is reached the linear electric machine may be controlled to operate as a motor again, for accelerating the ram block for striking the pile. When the linear electric machine is operated as a generator it supplies electric current induced based on the movement of the mover backwards from the pile to the energy storage, wherein the electric current may be stored directly as electrical energy to the energy storage.

In an example phase 1104 comprises that the harvested recoiled kinetic energy is supplied to the linear electric machine to accelerate the ram block for striking the pile. The harvested kinetic energy may be supplied from the energy storage. For example, when the operating mode of the linear electric machine is changed back from energy harvesting into motor, electricity from the energy storage may be supplied to the linear electric machine for accelerating the mover.

Figure 12:
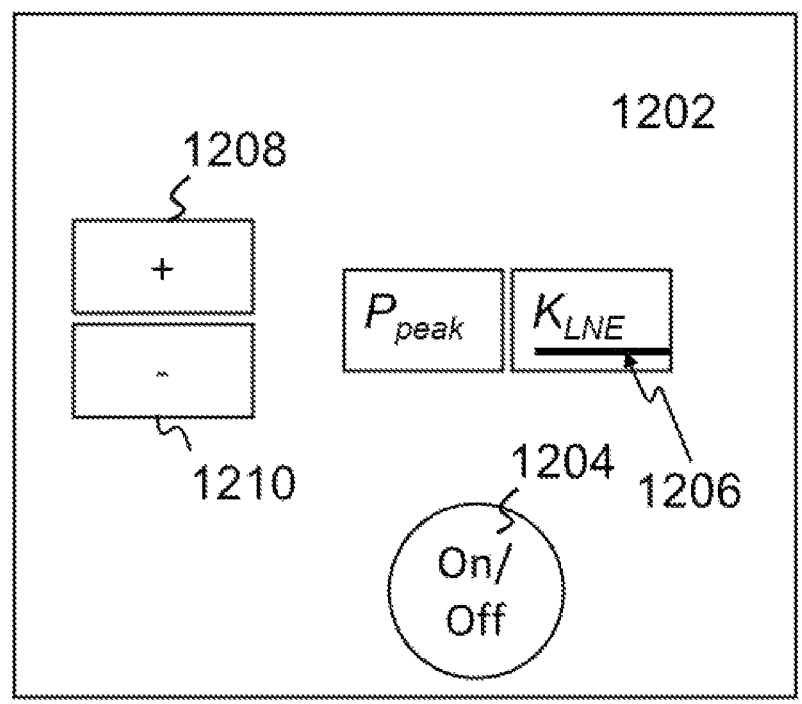
FIG. 12 illustrates a user interface according to at least some embodiments.

FIG. 12 illustrates a user interface according to at least some embodiments. The user interface may be operatively connected to a control device of a piling hammer. The user interface 1202 may be provided on a handheld device, for example a smart phone or a tablet computer, a control unit of a pile driving apparatus, or the user interface may be provided on a general purpose computer provided with a display. The control unit of the pile driving apparatus may be inside a cabin of a pile driving apparatus. The user interface comprises at least a display device for presentation of information. Preferably the user interface may provide, in addition to the output functionality e.g. by displaying information, also an input functionality for a user. The input functionality may provide that the user may enter one or more commands which may cause to control a linear electric machine of the piling hammer in accordance with the examples described herein. In an example the display device may be a touch screen for providing both an input and an output functionality to the user. The user interface may provide also other input means such as one or more buttons, keys and/or joysticks.

In an example in accordance with at least some embodiments, the user interface 1202 is operatively connected to a processor of the piling hammer and configured to display information indicating at least one of a first portion, $P_{peak}$, and a second portion, $K_{LNE}$, of the total target kinetic energy for striking a pile, $K_{tot}$. In an example, one or more values of the $P_{peak}$, and $K_{LNE}$ are displayed by the user interface.

In an example in accordance with at least some embodiments, if it is determined that the second portion, $K_{LNE}$, exceeds a threshold, e.g. a threshold energy level, the user interface 1202 is controlled to indicate information 1206 indicating that the threshold has been exceeded. In an example the information indicating that the threshold has been exceeded may comprise displaying an indicator in connection with a value of the $K_{LNE}$ and/or highlighting the value of the $K_{LNE}$.

In an example in accordance with at least some embodiments, the information indicating that the threshold has been exceeded comprises information indicating an addition 1208 of a ram block module to the modular ram block or a removal 1210 of a ram block module from the modular ram block. In this way the user may be prompted to add or remove one or more ram modules. Additionally a number of added or removed ram modules may be displayed.

In an example in accordance with at least some embodiments, the user interface 1202 is operatively connected to a processor and configured to display information indicating at least one of operational state of the regenerative braking, an amount of energy obtained by the regenerative braking and a charging state of an energy storage. In this way the user may obtain information about operation of the regenerative braking. Based on the displayed information the user may change the operational state of the regenerative braking. In an example the regenerative braking may be switched off or the regenerative braking may be switched on, e.g. if capacity of the energy storage is decreasing or the energy storage is empty or full.

In an example in accordance with at least some embodiments, the user interface may comprise an input element 1204 for changing an operational state of the regenerative braking of the linear electric machine. The operational state of the regenerative braking may be changed by the user operating e.g. by touching, the input element. If the operational state is switched off, the regenerative braking is not applied, whereby the mover of the linear electric motor is not decelerated by the linear electric machine, when the mover is recoiled after a blow. If the operational state is switched on, the regenerative braking is applied, whereby the mover of the linear electric motor is decelerated by the linear electric machine, when the mover is recoiled after a blow.

According to an embodiment, there is provided an apparatus comprising means for determining a total target kinetic energy for striking a pile using a ram block connected to a mover of a linear electric machine of the piling hammer, means for determining a first portion of the total target kinetic energy for striking the pile at least based on a mass of the ram block, means for determining a second portion of the total target kinetic energy for striking the pile based on the total target kinetic energy and the first portion of the total target kinetic energy, means for controlling the linear electric machine to accelerate the mover based on the determined second portion of the kinetic energy for striking the pile by the linear electric machine.

According to an embodiment, there is provided an apparatus comprising means for determining a recoiled kinetic energy from striking the pile using a ram block connected to a mover of the linear electric machine, means for determining at least a portion of the determined recoiled kinetic energy for returning the mover to a peak position after striking the pile, means for controlling the linear electric machine to decelerate the mover to the peak position based on the determined at least a portion of the determined recoiled kinetic energy.

Examples of the apparatus comprise at least a piling hammer and a control device for a piling hammer and a pile driving apparatus. The apparatus may comprise a memory stored with computer program code thereon, wherein the at least one memory and the computer program code are configured, with at least one processor of the apparatus, to cause the apparatus at least to perform on a method or at least part of functionalities of a method. The memory may be a non-transitory computer readable medium.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in/according to one embodiment" or "in/according to an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

What is claimed is:

1. A piling hammer comprising:
   a linear electric machine comprising a mover connected to a ram block for striking a pile;

a processor operatively connected to the linear electric machine and configured to:
determine a recoiled kinetic energy from striking the pile using a ram block connected to a mover of the linear electric machine;
determining at least a portion of the determined recoiled kinetic energy for regenerative braking of the mover to a peak position;
control the linear electric machine to decelerate the mover to the peak position based on the portion of the determined recoiled kinetic energy.

2. The piling hammer of claim 1, configured to:
determine said portion of the determined recoiled kinetic energy for returning the mover to a peak position after striking the pile based on a target striking frequency.

3. The piling hammer of claim 1, comprising:
an energy harvesting system for harvesting at least a part of the recoiled kinetic energy.

4. The piling hammer of claim 3, configured to:
control the linear electric machine to accelerate the mover based on the harvested kinetic energy.

5. The piling hammer of claim 1, wherein the piling hammer comprises a user interface operatively connected processor and configured to:
display information indicating at least one of operational state of the regenerative braking, an amount of energy obtained by the regenerative braking and a charging state of an energy storage.

6. The piling hammer of claim 1, wherein the piling hammer comprises a user interface comprising an input element for changing an operational state of the regenerative braking of the linear electric machine.

7. A method for striking a pile by a piling hammer comprising:
providing a processor operatively connected to a linear electric machine;
determining a recoiled kinetic energy from striking the pile using a ram block connected to a mover of the linear electric machine;
determining at least a portion of the determined recoiled kinetic energy for returning the mover to a peak position after striking the pile;
controlling the linear electric machine to decelerate the mover to the peak position based on the portion of the determined recoiled kinetic energy.

8. The method of claim 7, comprising:
determining said portion of the determined recoiled kinetic energy for returning the mover to a peak position after striking the pile based on a target striking frequency.

9. The method of claim 7, comprising:
harvesting at least a part of the recoiled kinetic energy by regenerative braking.

10. The method of claim 9, comprising:
controlling the linear electric machine to accelerate the mover based on the harvested kinetic energy.

11. The method of claim 9, comprising:
displaying information indicating at least one of operational state of the regenerative braking, an amount of energy obtained by the regenerative braking and a charging state of an energy storage.

12. The method of claim 9, comprising:
changing an operational state of the regenerative braking of the linear electric machine based on user input.

13. A non-transitory computer readable medium comprising program instructions for causing an apparatus to:
determine a recoiled kinetic energy from striking a pile using a ram block connected to a mover of a linear electric machine;
determine at least a portion of the determined recoiled kinetic energy for returning the mover to a peak position after striking the pile;
control the linear electric machine to decelerate the mover to the peak position based on the portion of the determined recoiled kinetic energy.

14. A pile driving apparatus comprising a piling hammer, the pile driving apparatus comprising:
a linear electric machine comprising a mover connected to a ram block for striking a pile;
a processor operatively connected to the linear electric machine and configured to:
determine a recoiled kinetic energy from striking the pile using a ram block connected to a mover of the linear electric machine;
determining at least a portion of the determined recoiled kinetic energy for regenerative braking of the mover to a peak position; and
control the linear electric machine to decelerate the mover to the peak position based on the portion of the determined recoiled kinetic energy.

* * * * *